United States Patent [19]
Ratte, Jr.

[11] 3,808,728
[45] May 7, 1974

[54] ATTACHMENTS FOR FISHING LINES
[75] Inventor: Wilfred L. Ratte, Jr., White Bear Lake, Minn.
[73] Assignee: Water Gremlin Company, White Bear Lake, Minn.
[22] Filed: Jan. 8, 1973
[21] Appl. No.: 321,865

Related U.S. Application Data
[63] Continuation-in-part of Ser. No. 282,260, Aug. 28, 1972, abandoned.

[52] U.S. Cl. ............................................. 43/44.91
[51] Int. Cl. ............................................. A01k 95/00
[58] Field of Search ...................... 43/44.91, 44.9

[56] References Cited
UNITED STATES PATENTS
2,772,509  12/1956  Vadnais ............................ 43/44.91
2,570,293  10/1951  Vadnais ............................ 43/44.91
2,807,907  10/1957  Brite ................................ 43/44.91
2,957,266  10/1960  Pfister ........................... 43/44.91 X FOREIGN PATENTS OR APPLICATIONS
575,390  4/1958  Italy .................................. 43/44.91
236,996  8/1959  Australia ........................... 43/44.91

Primary Examiner—Louis G. Mancene
Assistant Examiner—Daniel J. Leach
Attorney, Agent, or Firm—Jacobson and Johnson

[57] ABSTRACT

An attachment for a fishing line is provided which comprises a flexible elastic core for insertion into a fishing line body. The flexible core contains a slot located longitudinally therein for receiving a fishing line and a pair of ends which can be grasped in one's hand to twist the core around the line to firmly grasp the line as well as to cushion the line and prevent undue wear of the line. The core ends comprise converging sections which are large enough for grasping as well as small enough to make the body and core weedless.

16 Claims, 9 Drawing Figures

PATENTED MAY 7 1974 3,808,728
SHEET 1 OF 3
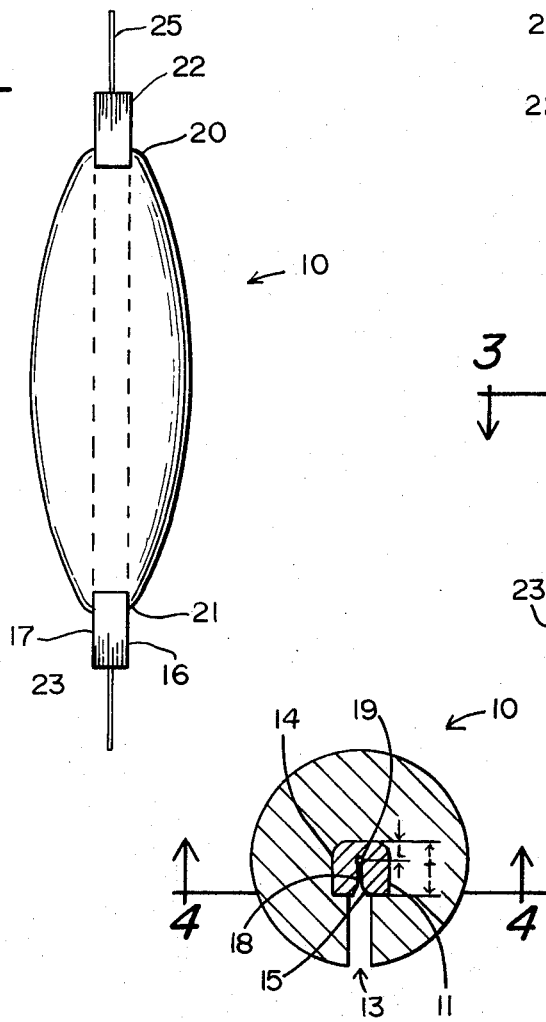
Fig. 1
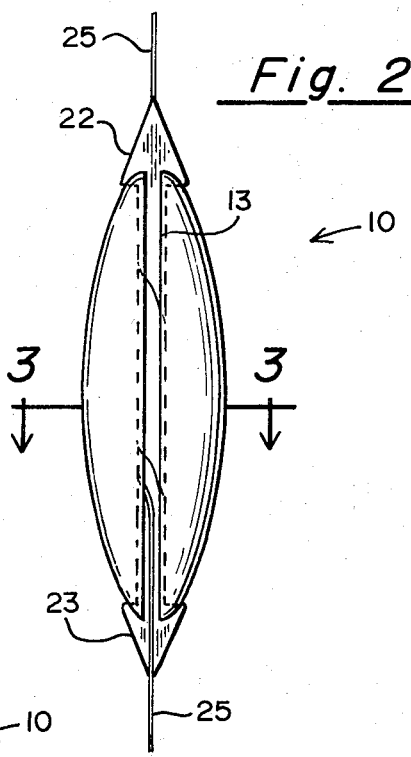
Fig. 2
Fig. 3
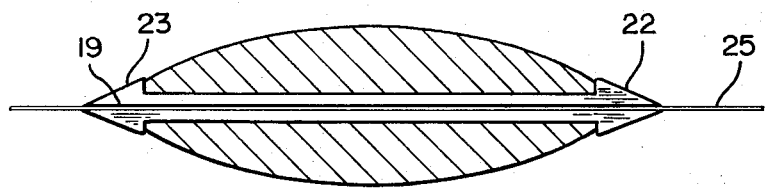
Fig. 4
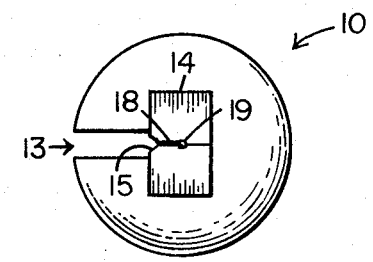
Fig. 5

ATTACHMENTS FOR FISHING LINES

CROSS REFERENCE TO RELATED APPLICATIONS

This application is a continuation-in-part of my application Ser. No. 282,260, filed Aug. 28, 1972, titled "Attachments for Fishing Lines" now abandoned.

BACKGROUND OF THE INVENTION

1. Field of the Invention

This invention relates generally to attachments for fishing lines and more specifically, to improvements in means for attaching sinkers to fishing lines.

2. Description of the Prior Art

The fishing sinker and fishing industry has grown vastly in the past few years. One of the most useful items in a fisherman's tackle box is a type of sinker which is shown in Vadnais U.S. Pat. No. 2,772,509 which is assigned to the same assignee as the present invention. Briefly, this invention comprises an elongated sinker having an axial passage and aperture extending longitudinally through the sinker. A flexible core is located in the aperture which is located in the center of the sinker. The flexible core can be twisted around the line to securely hold the line within the sinker. This particular fishing sinker has enjoyed extreme popularity in its widespread use because it can be easily attached to a fishing line as well as easily removed from the line by merely pulling and twisting on the rounded tabs located on the flexible core. This type of sinker attachment means is also very beneficial because it reduces the amount of line contact with the lead sinker by placing the point of highest stress against the flexible core rather than against the lead. Although this type of sinker enjoys widespread popularity, there are some disadvantages with this type of sinker. For example, the line passes through the sinker in an off center position which causes the sinker to act as a propeller. This propeller action causes the line to twist when the sinker is pulled through the water. That is, the sinker oftentimes winds and twists the line therefore snarling it. In addition, because of the rounded hand hold tabs on the end of the flexible core, the line and the sinker oftentimes coact to catch weeds.

Still another type of prior art sinker is shown in the Baron U.S. Pat. No. 3,096,599 which shows a fishing line located centrally within a resilient core located in the sinker. In this type of sinker, the line is squeezed or compressed in the sinker by pushing or turning a plug to thereby frictionally hold the line against the lead portion of the sinker or within the resilient core of the sinker. In some embodiments shown in Baron, the line is centrally located, in other embodiments, it is not. However, the configuration in which the line does not pass through the center does not produce a balanced or streamlined sinker. However, Baron's devices are inadequate as the sinker slips along the line if the plug or core is not fastened securely to the sinker. In addition, it is very difficult to apply or tighten the Baron sinker without special tools. Furthermore, the Baron sinker is not weedless and thus snags in the weeds.

Thus, these types of prior art sinkers have been known in the prior art and while each has offered some advantages, they have certain disadvantages which, to date, have not been overcome. Therefore, more specifically, the present invention comprises an improvement to the Vadnais patent which comprises an additional slot passing longitudinally through the flexible core which is located centrally within the center of the sinker. Furthermore, I have provided tapered ends to the flexible core which are weedless and which can still be grasped by an operator to twist the core. In addition, the present invention provides a sinker which automatically centers the line within the sinker body because of the flexible core. Because the flexible core twists around the line rather than the line around the core, it firmly holds and cushions the line within the sinker. Furthermore, because of the automatic centering feature the sinker and attachement means do not coact as a propeller, i.e., the sinker and flexible core remain symmetrically with respect to the sinker when attached to the line. Also, the streamlined shape of the nose makes the sinker weedless thus eliminating snagging of the sinker in weeds. In addition, the attachment and detachments of the present invention to a fishing line can easily be accomplished without the use of any tools. Thus, some of the prior art problems encountered with prior art sinkers have been overcome with the present invention with the discovery of the improved dynamic characteristics of the present sinker.

SUMMARY OF THE INVENTION

Briefly, the present invention comprises a body having an aperture extending longitudinally therethrough and a slot communicating with the aperture. A flexible resilient core extends through the aperture. The flexible core has a slot extending longitudinally through it for receiving a fish line. After placing the fish line in the slot in the flexible core, the core ends can be grasped and rotated in opposite directions to wind the core around the line which simultaneously centers the line within the sinker. In an alternate embodiment, two pairs of wedge-shaped surfaces coact to insure the line remains center as well as virtually eliminate any possibility of the sinker becoming entangled in weeds.

BRIEF DESCRIPTION OF THE DRAWING

FIG. 1 is a side elevation view of the sinker showing the relationship of the parts therein;

FIG. 2 is a front elevation view of the sinker shown in FIG. 1;

FIG. 3 is a sectional view taken along line 3—3 of FIG. 2;

FIG. 4 is a front sectional view of the flexible core located within the sinker;

FIG. 5 is an end view, partly in section of the flexible core and sinker shown in FIG. 4;

DESCRIPTION OF THE PREFERRED EMBODIMENT

Figure 6:
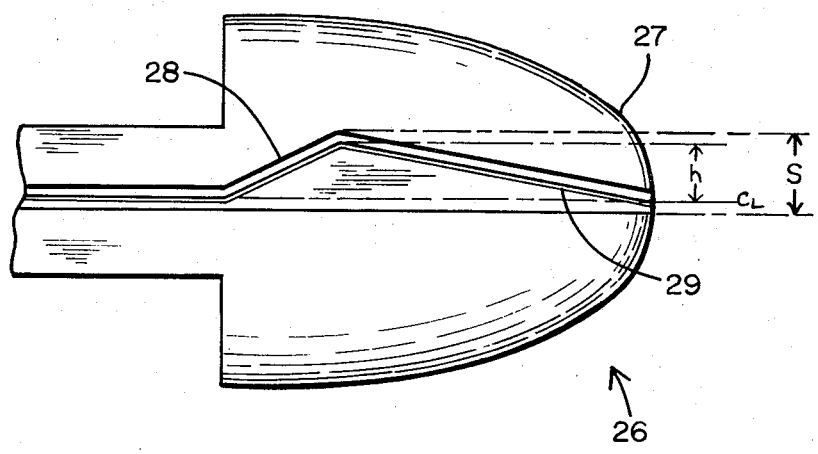
FIG. 6 is a view of an alternate embodiment of my flexible core.

Referring to FIGS. 1, 2 and 3, the sinker body is generally identified by reference numeral 10. Sinker 10 contains an axial aperture 11 which extends longitudinally through sinker 10. The particular axial aperture 11 is shown as having a square or rectangular cross section with rounded corners. The rounded corners are preferred because it makes it easier to insert the core into the sinker. The particular rectangular or square cross section or shape is preferred because a mating core 14 can be easily formed from a flexible material. However, other materials and cross sectional shapes could also be utilized in the sinker. However, it is advantageous and preferred to have a core that has a rectangular, square or triangular configuration so that the partial rotation of the core produces a potential energy valley thus requiring additional energy input to return the core to its initial position.

FIG. 4 more clearly illustrates the sinker core with an axial aperture 19, an axial slit 18 and a tapered guide slot 15 that enables one to easily insert the line in core 14.

Located in sinker 10 is a radial extending slot 13 which extends along the entire length of sinker 10 to thereby form communication with axial aperture 11. Although slot 13 extends into the center of sinker 10, it is substantially narrower in width than axial aperture 11 to prevent core 14 from being easily pulled out of axial aperture 11. The portion of core 14 within axial aperture 11 has a similar shape to the aperture within the elongated sinker body. However, the ends of core 14 are provided with tabs or converging sections 22 and 23 having the shape of an isosceles triangle which have opposed flat surfaces 16 and 17. The opposed flat surfaces 16 and 17 enable one to grasp the ends between his fingers. By grasping, pulling and rotating ends 22 and 23 in opposite directions, one rotates core 14 around a fishing line 25. The purpose of twisting core 14 is to have core 14 simultaneously wrap and collapse around and cushion the line thus serving the dual function of holding and cushioning a line within the sinker. However, the feature of centrally cushioning the line is only obtained if an axial aperture 19 extends centrally through flexible core 14. If no slot or aperture is provided in the core, then the line wraps around the core inside the body of the sinker as shown in the aforementioned Vadnais patent. Flexible core 14 should be rotated around line 25 to lock the core against the body of the sinker to prevent slipping of the sinker. While both a slot and aperture are shown as the preferred embodiment, I can also utilize the invention with only a slot; however, the aperture improves the line holding capacity of the core.

In order to obtain maximum effectiveness of core 14, I have discovered that I improve the holding capacity of the core if the distance of the axial aperture from the back of core 14 (denoted by character L) is approximately one-third of the thickness of the core (denoted by character T). This provides sufficient material so that without twisting core 14, the line will not slip or fall out of aperture 19. However, even though aperture 19 is offset from the center of core 14, aperture 19 is still located symmetrical with respect to sinker body 10. Although the axial aperture is located in the lower one-third of the core to provide more holding action, it is also envisioned that a larger core could achieve the same results; however, it would be more difficult to twist a larger core.

An unexpected advantage with having the slot in the sinker is that the fish line does not have to be twisted or kinked to fasten it to the line, i.e., the line passes straight through the core as the turning of the cores does not wrap the line around the core. This feature is especially important if monofilament line is used as it does not produce any kinks or bends in the line if the sinker is removed.

This feature of locking the core to the sinker is more clearly shown in FIGS. 1 and 2 which show a sinker having a notch 20 and a notch 21 on the other end. Notches 20 and 21 are arranged so that the back portion of tabs 22 and 23 can engage the notches at 180° intervals. When the tabs or ends are in the notches, they prevent flexibles core 14 from rotating. Thus, it will be apparent from the present invention that the line is positively held within a core of the sinker through a centrally located flexible core.

In order to better appreciate the operation of the invention, the operation of attaching and detaching a line to the sinker will now be described. In order for an operator to attach line 25 to sinker 10, he places line 25 through slot 13, through guide slot 15, axial slot 18 and into axial aperture 19 which is located within flexible core 14 (FIG. 4). Placing line 25 within axial aperture 19 of flexible core 14 loosely holds the line within the sinker and in this position line 25 could quite easily slip out of sinker 10. Referring to FIG. 2, the top half of flexible core 14 has been rotated half a turn clockwise so that part of aperture 19 faces the back portion of sinker 10. The next step is to rotate the bottom portion of flexible core 14 in the opposite direction until the portion of aperture 19 on the lower part of flexible core 14 also faces the back of sinker 10. This prevents line 25 from slipping out of a slot 13 in a sinker 10. However, more important, line 25 is centered within core 15 so that it projects out the end, as shown in FIG. 1, i.e., it is symmetrically located with respect to sinker 10 thus providing a streamline dynamic shape which will not readily attach itself to weeds.

While the flexible core can be made of a variety of materials, such as conventional elastomers, it has been found that certain synthetic materials work very well. A typical example of such a material is the styrene-butadiene thermoplastic material. The styrene-butadiene is a block copolymer which may be purchased under the trademark Kraton Thermoplastic Rubbers. These unique rubbery and thermoplastic characteristics of the styrene-butadiene block copolymer plus the frictional characteristics of the material make it well suited for use as flexible cores in my sinker.

Referring to FIG. 6, reference numeral 26 designates the end portion of an additional embodiment of a flexible core for use in sinker 10. As the opposite end of flexible core 26 is identical to that shown in FIG. 6, only one end and a portion of the flexible core are shown. The end tab of flexible core 26 has a rounded nose 27 as opposed to the wedge-shaped nose of ends 22 and 23. Core 26 contains a slit 29 which is in communication with an aperture (not shown) which is located beneath slit 29. The aperture and slit 29 are offset slightly from the axis of symmetry of the flexible core by introducing a bend in the line. This non-linear line aperture creates additional line holding capacity. That is, when a line placed in the curved or bowed slit in core 26, any pulling motion on the line causes the core to force itself against the line.

In order to facilitate the threading of a line into the bowed slit 29, there is provided a guide slot 28 which has a width "s". The width "s" is such that it is wider than the amount of deviation of the line from the center line which is identified by reference character "h". Thus, when one places a fishing line along the center line, the "v" shaped edges 28 automatically guide the fishing line into slit 29 and the aperture located beneath it.

In order to prevent twisting and bending of end 26 when there is a pulling force on the fishing line, slit 29 and the aperture (not shown) are designed so that the aperture projects substantially along the axis of symmetry of core end 26. In addition, the deviation "h" of slit 29 and the corresponding axial aperture is typically kept on the order of 0.030 thousandth of an inch. With this small deviation, there is substantially little tilting or bending of end 26 when one pulls on the fishing line. In addition, a further improvement resides in the discovery that the point of maximum deviation of the aperture and the slit on the back half of the end 26 which engages the sinker body substantially removes any twisting or bending of end 26 as well as providing a resilient holding force. With the point of maximum deviation less than one-third of the way from the portion of the end which engages the sinker body, it virtually eliminates any tipping or bending of the core ends.

Figure 7:
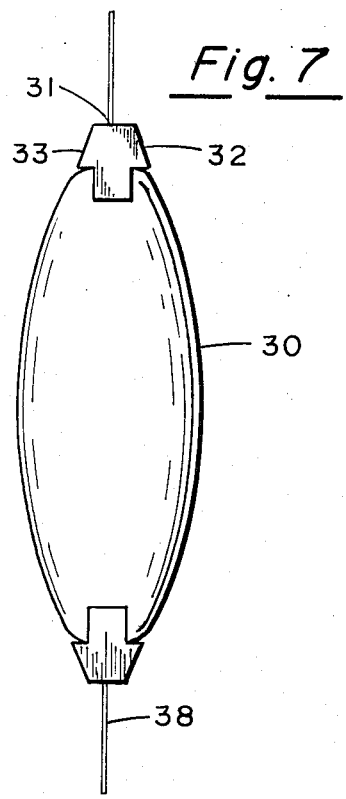
FIG. 7 is a side elevation view of an alternate core of my sinker.
Figure 8:
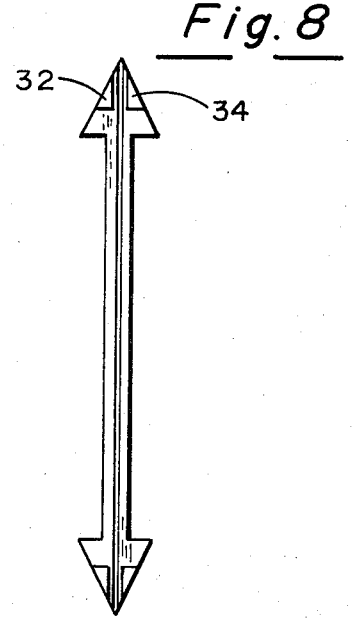
FIG. 8 is a front elevation view of the core shown in FIG. 7.
Figure 9:
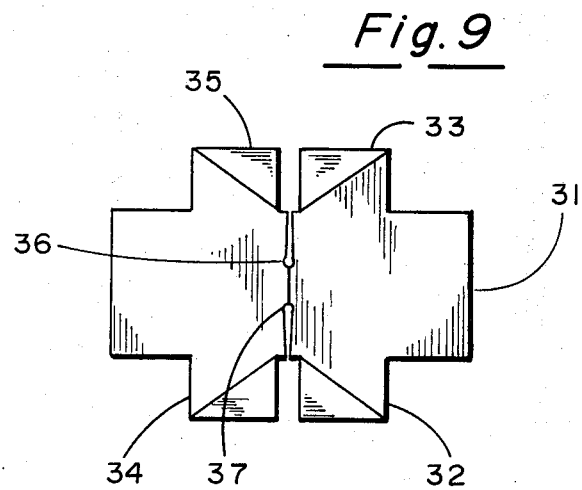
FIG. 9 is an end view of the flexible core shown in FIG. 7 and FIG. 8.

Referring to FIG. 7, reference numeral 30 designates still another embodiment of the present invention. The sinker has the conventional elongated body but the core 31 extending through sinker 30 has been slightly modified. Core 31 is made from the same elastomer materials as before; however, an additional pair of ramped or elevated surfaces 32 and 33 are provided on opposite faces of the ends of core 31. Referring to FIGS. 7-9, it is apparent that there are four ramp-like surfaces 32, 33, 34 and 35 on the end of core 31. Similarly, the opposite end of core 31 contains identical ramps thereon; however, as they are identical they will not be described herein. For purposes of describing the ramp-like surfaces, I prefer to call them appendages. The purpose of the appendages on each side of the wedge-shaped tab is to provide three improvements to the core. The first feature of the appendages is that they direct weeds over them and thus virtually eliminate any possibility of a weed being caught between the wedge-shaped tab and the sinker body. The second feature of the appendages is that they add stiffness to the wedge-shaped tab thus preventing the line 38 from moving from the central position within the longitudinal aperture 36. By maintaining the line in the longitudinal aperture, it enables one to use a core having a pair of longitudinal apertures 36 and 37. With a pair of longitudinal apertures in core 31 it enables one to place the line in an aperture even if the core is facing backward. The third feature of the appendages is that they make it easier for a fisherman with wet hands to remove or insert the sinker on a line. That is, by inserting the fingernail behind appendages 32 and 34 and the thumbnail behind appendages 33 and 35, one can firmly grasp the core with the fingernail and the thumbnail, thus allowing one to pull and twist it. This feature is very useful if one's hands are slippery from handling a fish.

I claim:

1. An attachment for fishing lines comprising:
   an arrangement including in combination, an elongated body having an aperture extending longitudinally therethrough and a slot located in said body and communicating with said aperture, said aperture partially defined by an open surface for communicating with said slot in said elongated body and a closed surface defined by said elongated body, said elongated body further having means for locking a flexible and twistable core in a non-rotatable position;
   a flexible and twistable core extending through said body, said flexible and twistable core having a first end with a tab for grasping by the finger of a fisherman; a second end with a tab for grasping by the finger of a fisherman, said flexible and twistable core having a slot extending longitudinally therethrough for receiving a fishing line, said flexible and twistable core and said elongated body coacting to have a line receiving position in which said slot of said twistable core is in alignment with said slot located in said body so that a fishing line can be inserted through said slot located in said elongated body and into said slot of said twistable core and a line holding position in which said twistable core and said elongated body coact to hold a fishing line when said first end of said twistable core is twisted in a first direction to thereby place a portion of the first end of said twistable core and said slot adjacent the closed surface of said aperture in said elongated body and the second end of said twistable core is twisted in a direction opposite to the direction of twisting said first end to thereby place a portion of the second end of said twistable core and said slot in said twistable core adjacent the closed surface of said aperture in said elongated body, said twistable core thereby twistably encapsulating said fishing line to thereby firmly hold said line in a central position within said elongated body.

2. The invention of claim 1 wherein the body comprises a sinker.

3. The invention of claim 2 wherein the sinker has an oval shape.

4. The invention of claim 3 wherein said tabs have a pointed end.

5. The invention of claim 4 wherein the cross-section of said flexible core is square.

6. The invention of claim 5 wherein said flexible core is made of styrene-butadiene.

7. The invention of claim 6 wherein said means for locking the core comprises notches in said body.

8. The invention of claim 3 wherein the slot in said flexible core has a thickness denoted by "T" and the depth of the slot is approximately 2/3 "T".

9. The invention of claim 8 wherein the slot in said flexible core forms an angle with itself in at least one point.

10. The invention of claim 9 wherein the angle is located in said tabs.

11. The invention of claim 10 wherein said flexible core has a guide slot for directing a line into said slot.

12. The invention of claim 11 wherein said angle is located in the back half of said tabs to prevent bending of said tabs.

13. The invention of claim 12 wherein the deviation of said slot from an axis of symmetry extending through said sinker is denoted by "h" and the maximum width of said guide slot is denoted by "S" with the dimensions "S" being greater than the dimension "h".

14. The invention of claim 1 wherein said tabs having appendages thereon for grasping and for centrally holding the line within said slot of said flexible core.

15. The invention of claim 14 wherein said appendages comprise ramp-like surfaces for directing weeds around said elongated body.

16. The invention of claim 15 wherein said core has at least two slots extending longitudinally therethrough.

* * * * *